No. 648,019. Patented Apr. 24, 1900.
W. BRITAIN, Jr.
KINEMATOGRAPH.
(Application filed Oct. 20, 1899.)

(No Model.) 9 Sheets—Sheet 1.

Witnesses
A. J. Hadday
L. E. Shepherd

Inventor
W. Britain Jr.
by his Attorney, R. Hadda

No. 648,019. Patented Apr. 24, 1900.
W. BRITAIN, Jr.
KINEMATOGRAPH.
(Application filed Oct. 20, 1899.)
(No Model.) 9 Sheets—Sheet 2.

Witnesses
Inventor
W. Britain Jr.
by his Attorney

No. 648,019. Patented Apr. 24, 1900.
W. BRITAIN, Jr.
KINEMATOGRAPH.
(Application filed Oct. 20, 1899.)

(No Model.) 9 Sheets—Sheet 3.

Witnesses
Inventor
W. Britain Jnr
by his Attorney

No. 648,019. Patented Apr. 24, 1900.
W. BRITAIN, Jr.
KINEMATOGRAPH.
(Application filed Oct. 20, 1899.)
(No Model.) 9 Sheets—Sheet 4.
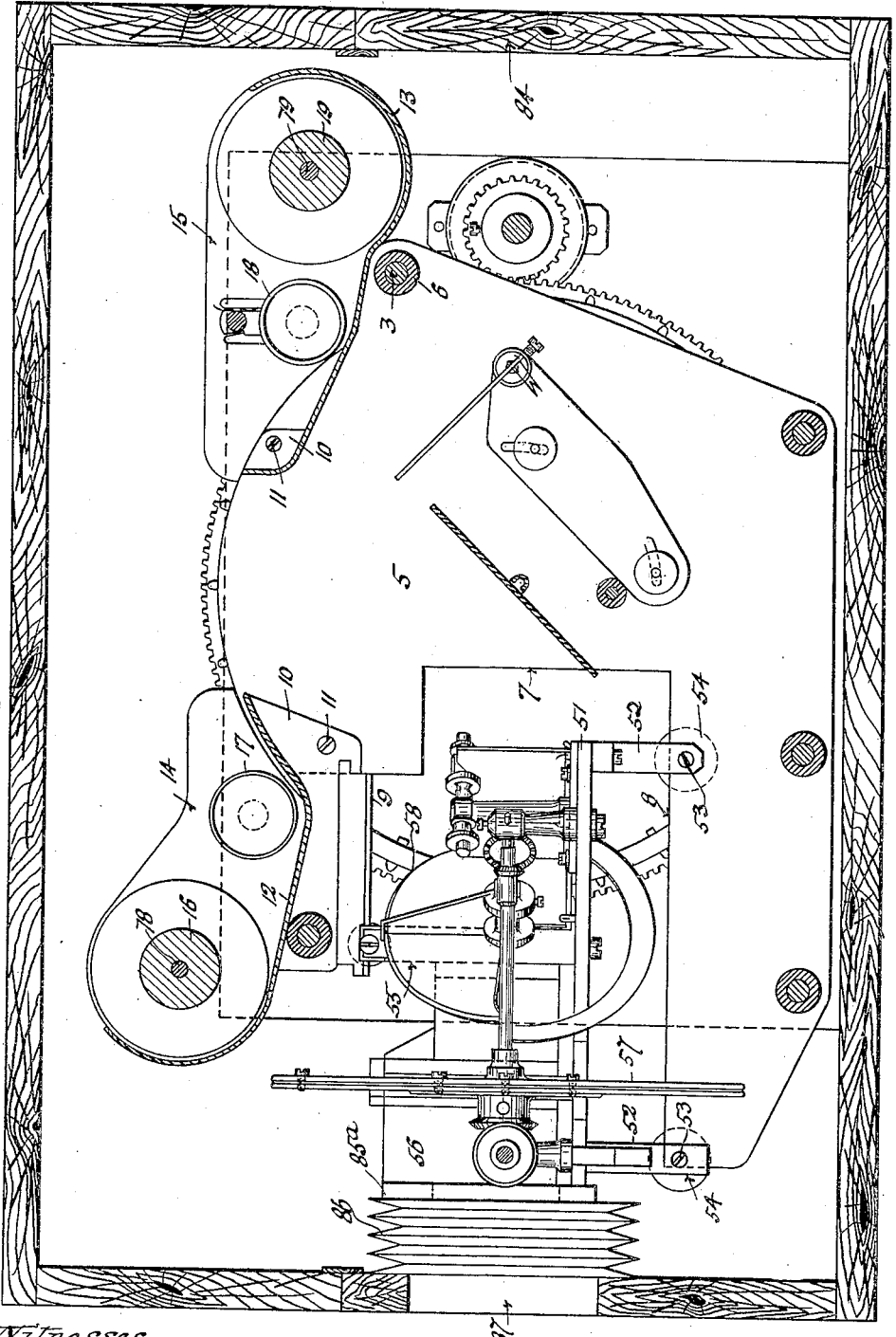

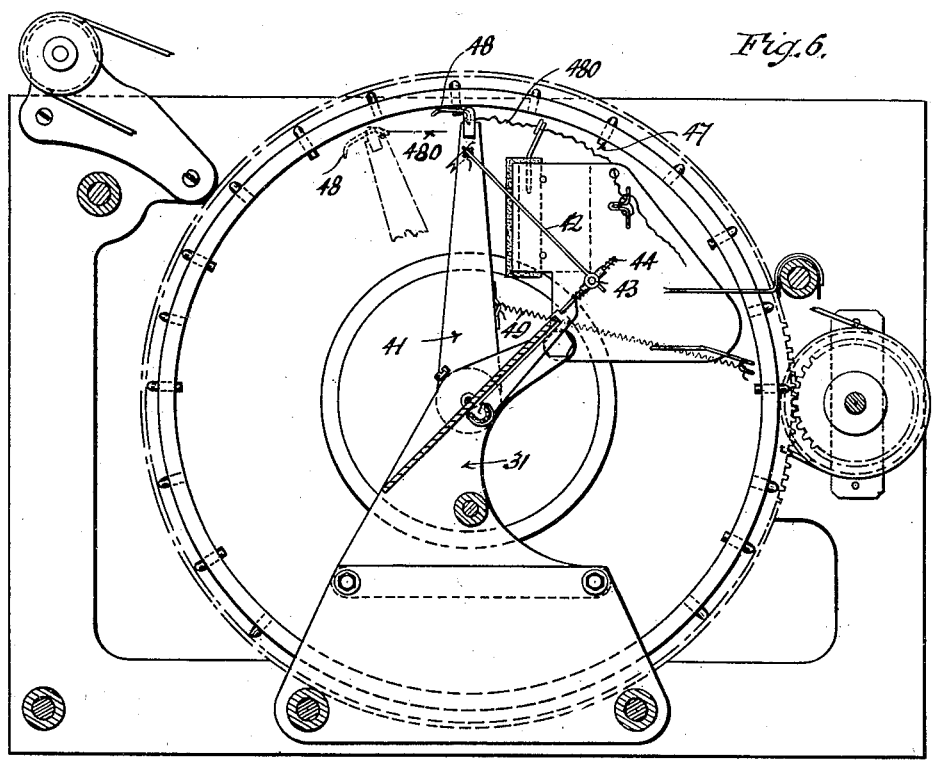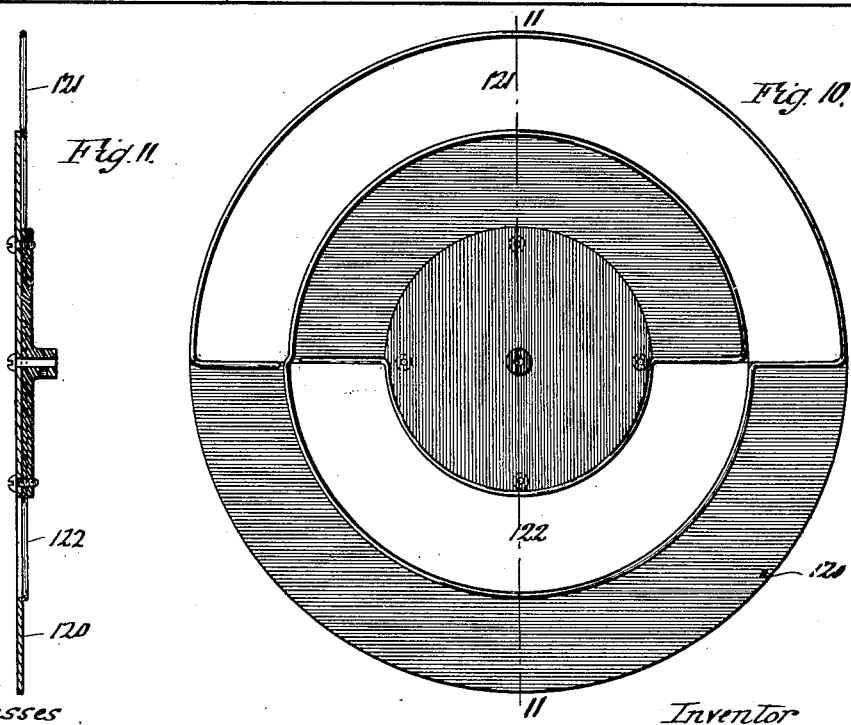

No. 648,019. Patented Apr. 24, 1900.
W. BRITAIN, JR.
KINEMATOGRAPH.
(Application filed Oct. 20, 1899.)

(No Model.) 9 Sheets—Sheet 6.

No. 648,019. Patented Apr. 24, 1900.
W. BRITAIN, Jr.
KINEMATOGRAPH.
(Application filed Oct. 20, 1899.)
(No Model.) 9 Sheets—Sheet 7.

Witnesses
Inventor
by his Attorney

No. 648,019. Patented Apr. 24, 1900.
W. BRITAIN, JR.
KINEMATOGRAPH.
(Application filed Oct. 20, 1899.)

(No Model.) 9 Sheets—Sheet 8.

Figure 9:
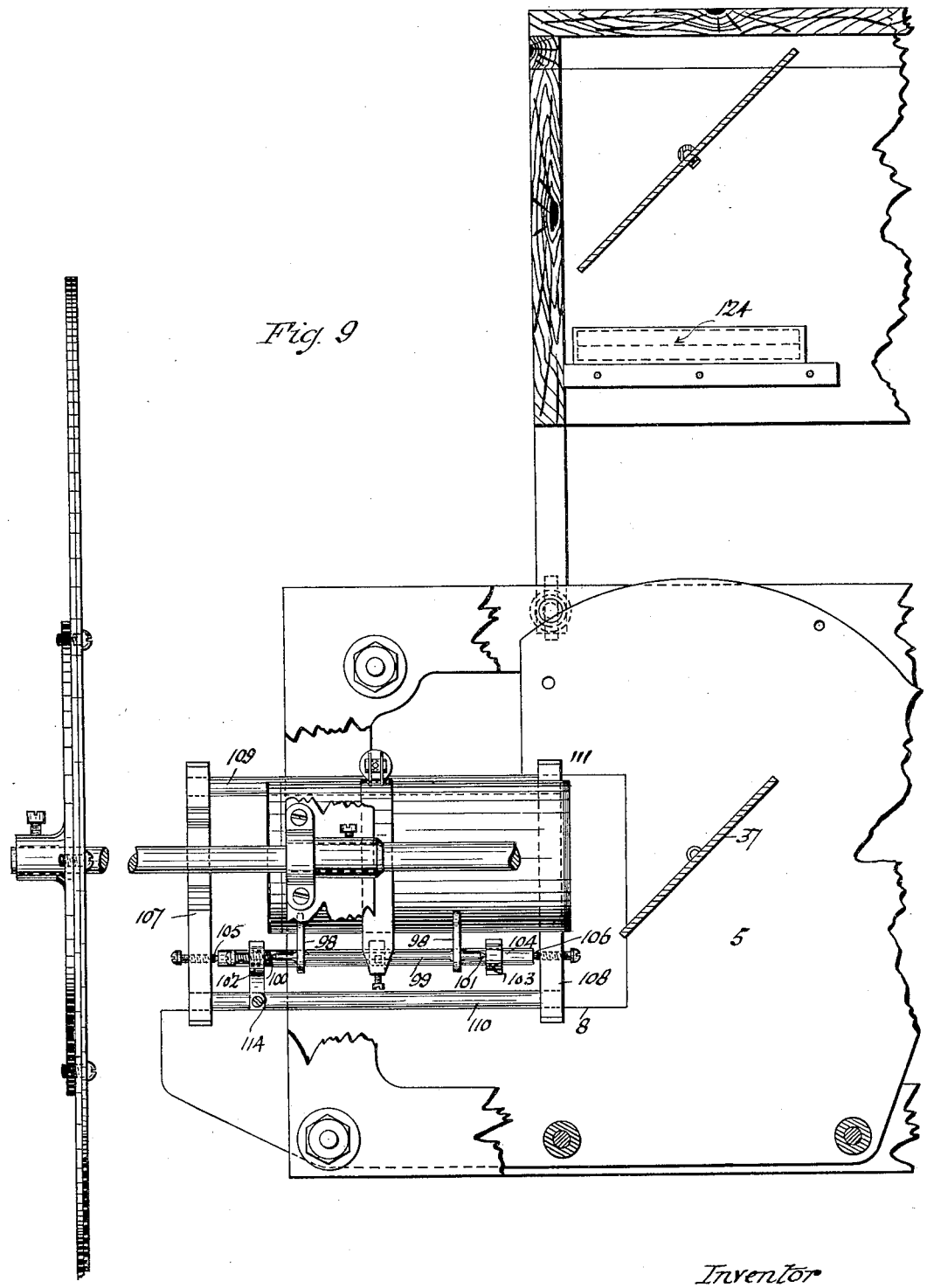

No. 648,019. Patented Apr. 24, 1900.
W. BRITAIN, Jr.
KINEMATOGRAPH.
(Application filed Oct. 20, 1899.)
(No Model.)  
9 Sheets—Sheet 9.
Fig. 9ª.
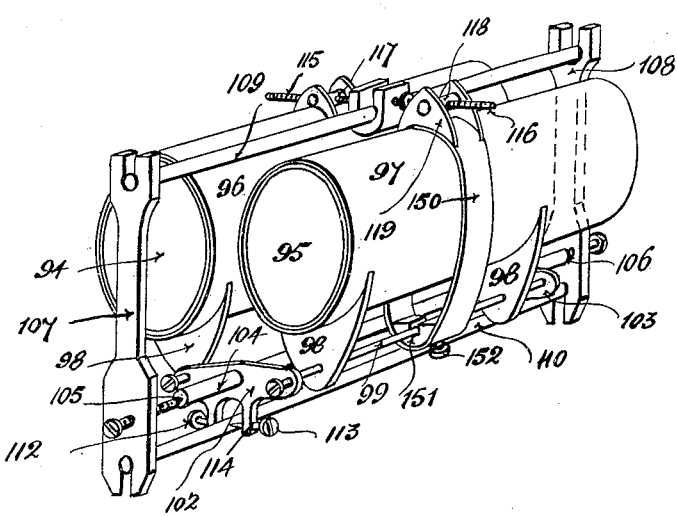
Witnesses  
A. J. Hadday  
E. Ducoffre
Inventor  
William Britain Jr  
by his Attorney R. Hadday

UNITED STATES PATENT OFFICE.

WILLIAM BRITAIN, JR., OF LONDON, ENGLAND.

KINEMATOGRAPH.

SPECIFICATION forming part of Letters Patent No. 648,019, dated April 24, 1900.

Application filed October 20, 1899. Serial No. 734,276. (No model.)

*To all whom it may concern:*

Be it known that I, WILLIAM BRITAIN, Jr., a subject of the Queen of England, residing at 28 Lambton road, Hornsey Rise, London, N., England, have invented certain new and useful Improvements in Kinematographs, of which the following is a specification.

One of the objects of this invention is to enable an apparatus for taking and for projecting series of photographs to so take and project the same that there is no interval of darkness or interruption in the taking or projecting of any one photograph of the series and the next photograph thereof, and also no appreciable variation in the intensity or quantity of light during the taking or projecting, respectively, so far as the light is being utilized in the taking or projecting of any one photograph of a series. By attaining this purpose the objectionable flickering of the consecutive series of images hitherto found with instruments of this class and due to alternate illumination and obscuration is avoided and the images appear to the eye to be continuous and always equally and uniformly light.

A further object, which is also to some extent an incidental advantage of the above principle, is to increase the length of the period of exposure of each individual photograph, by which means increased detail is obtained in the photograph so far as stationary objects are concerned or those whose movement is sufficiently slight during the period of exposure to escape detection. By this means also, and especially when combined with the continuous and uninterrupted exposure of the series as a whole, I am enabled to, indeed, turn to advantage the blur of moving objects which others have sought to avoid or overcome and utilize this blur for the accurate reproduction of moving objects to the eye as they are, in fact, seen by the eye in nature.

A further object, and one also partly incidental to the above advantages, is to enable fewer photographs to be taken per second, and thus enable the size of each to be larger than is possible with other systems based upon intermittent projection, and, as will hereinafter appear, I am also enabled to reduce the speed of the film bearing the series of photographs by the principle of construction involved in the production of the apparatus to give continuous projection in the sense in which it is to be understood in this description.

A further object is to enable the film to be continuously and uniformly moved during exposure and projection, with which movement there is less strain on the film than when intermittent movement is employed.

The means by which I preferably carry my invention into effect are illustrated in the annexed drawings, in which—

Figure 1:
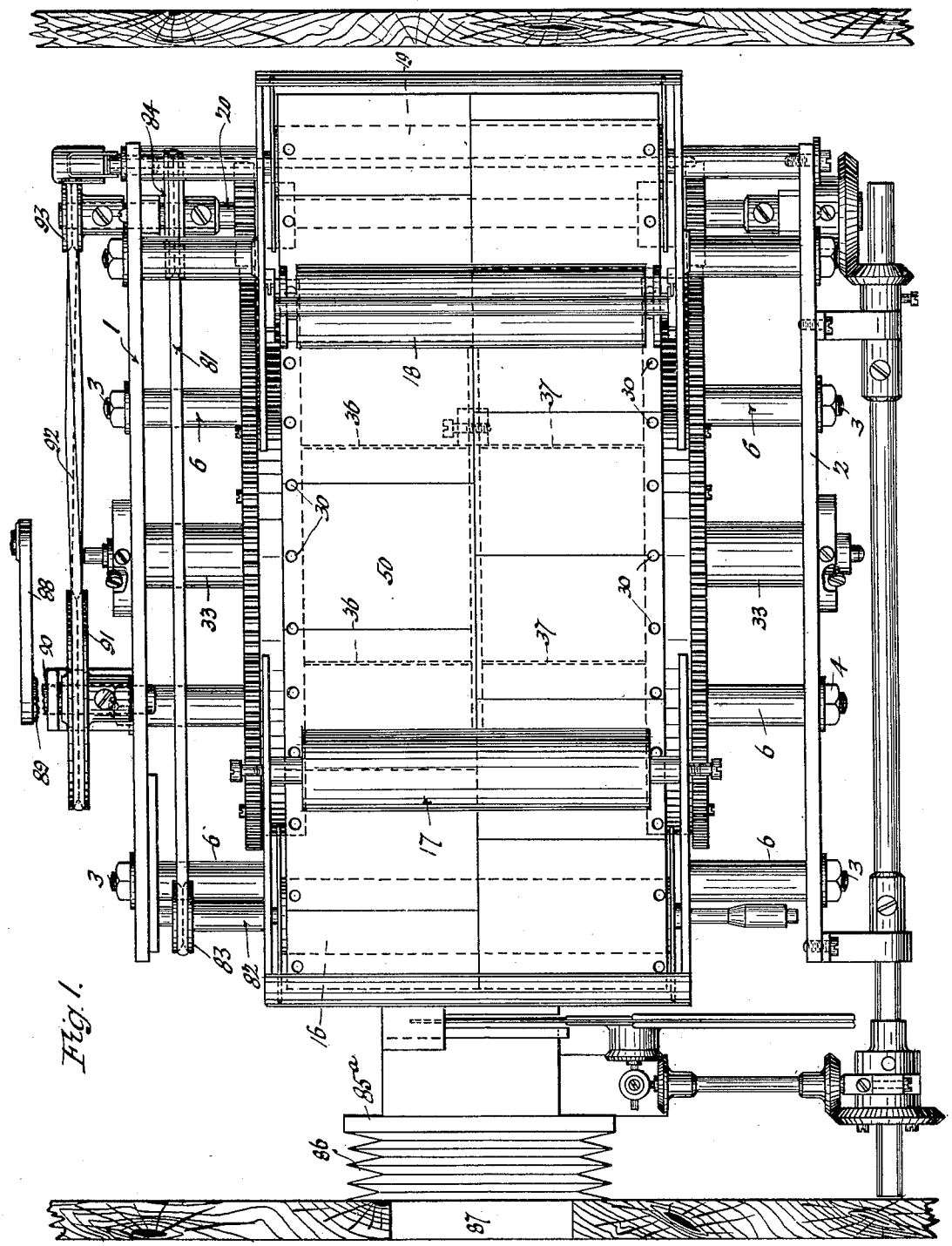
Figures 2, 5:
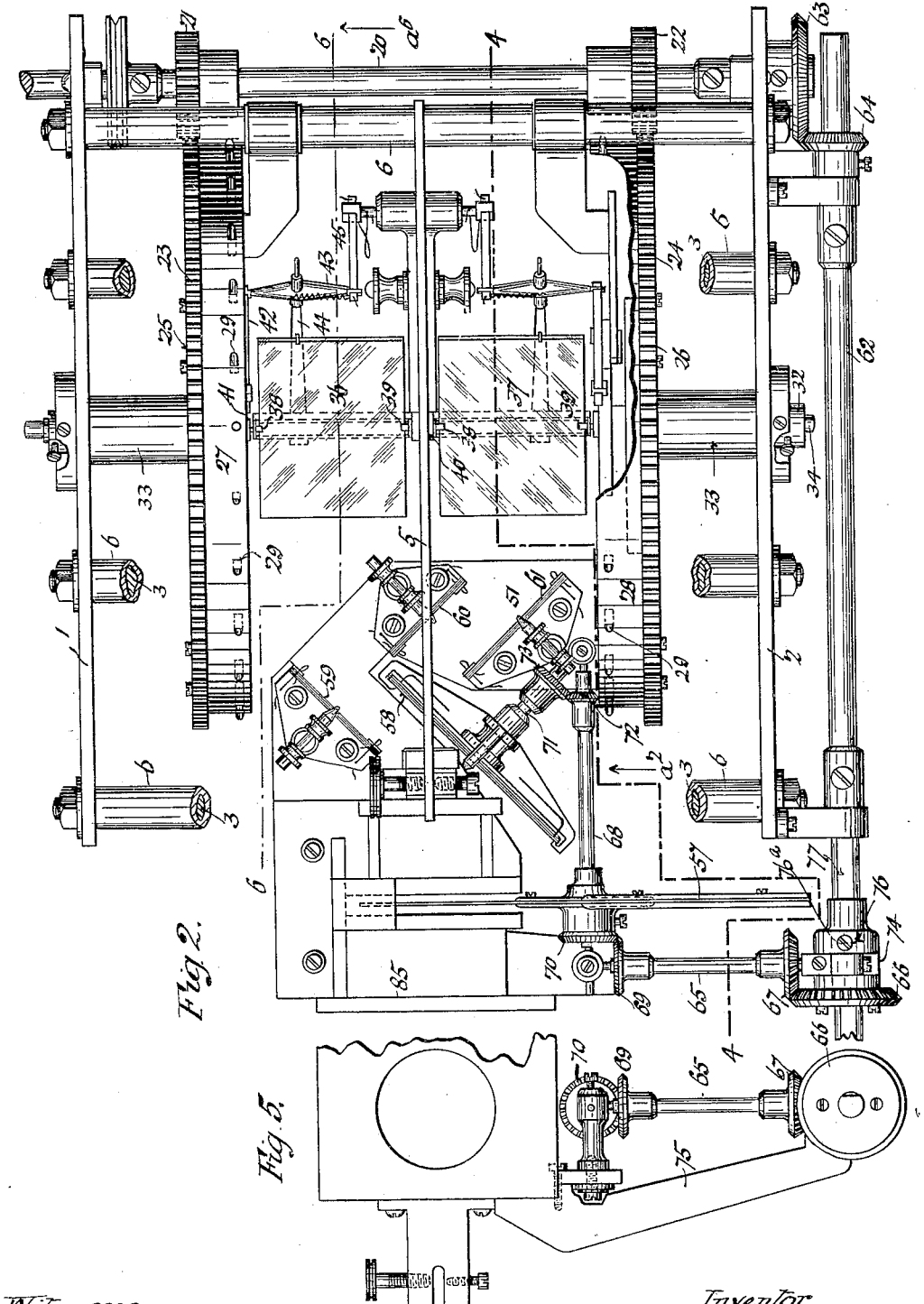
Figure 3:
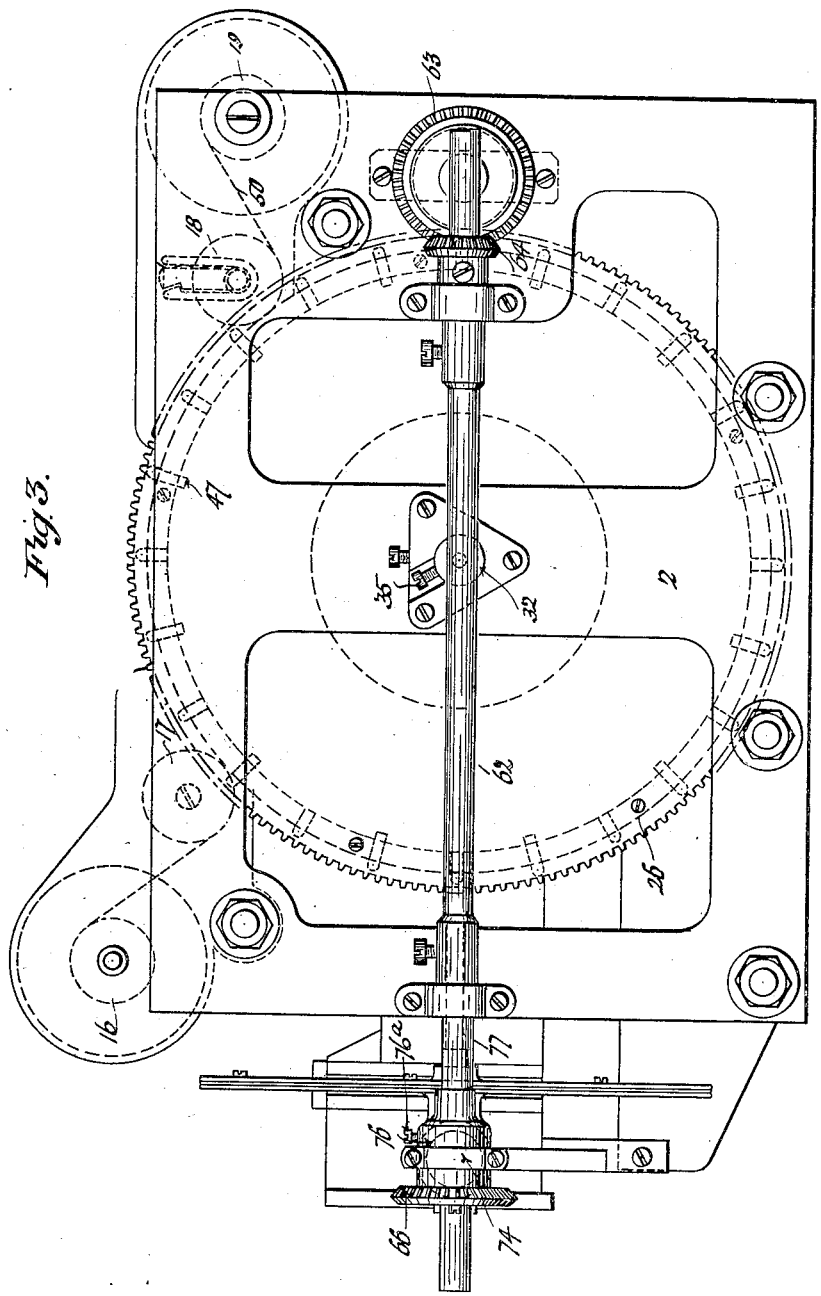
Figure 7:
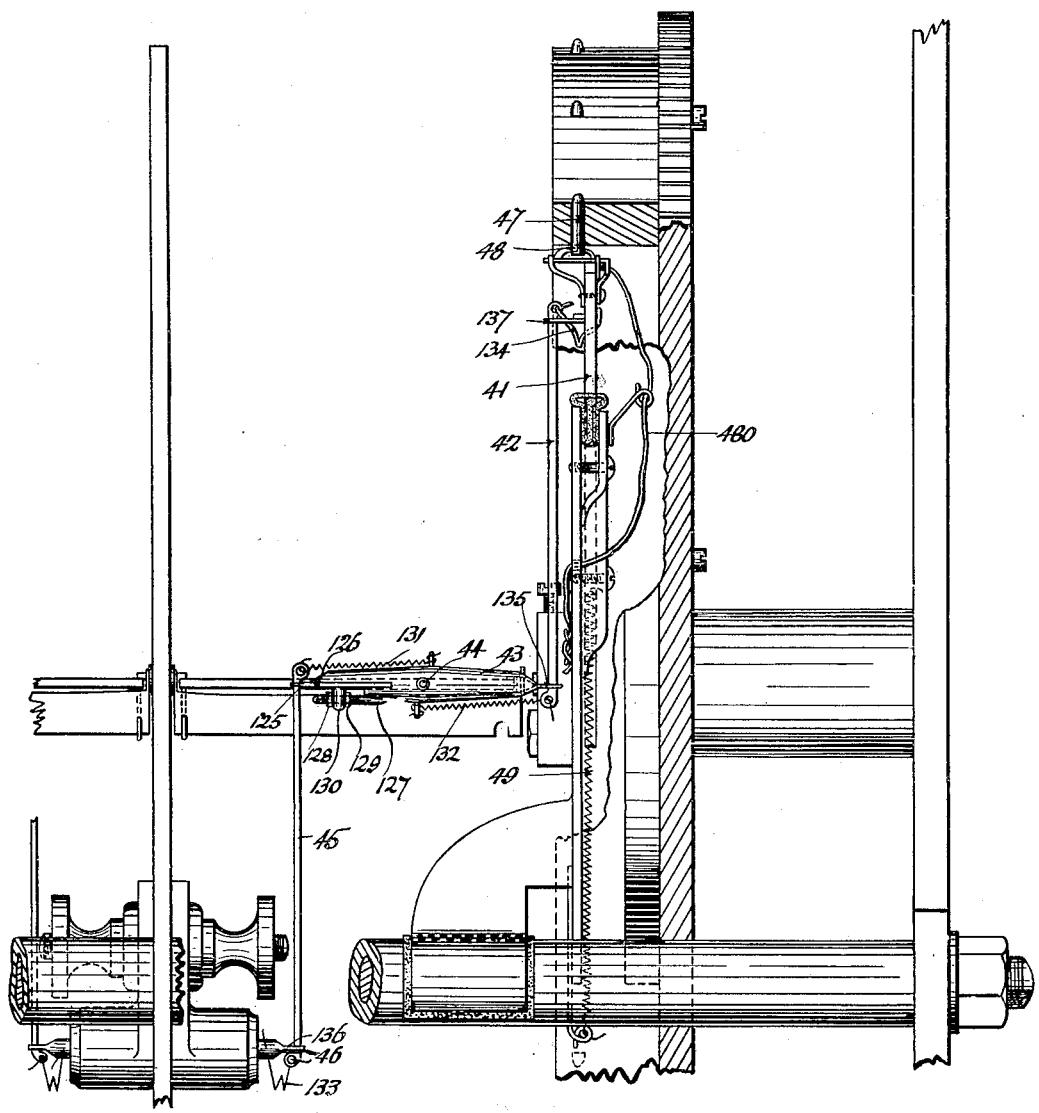
Figure 8:
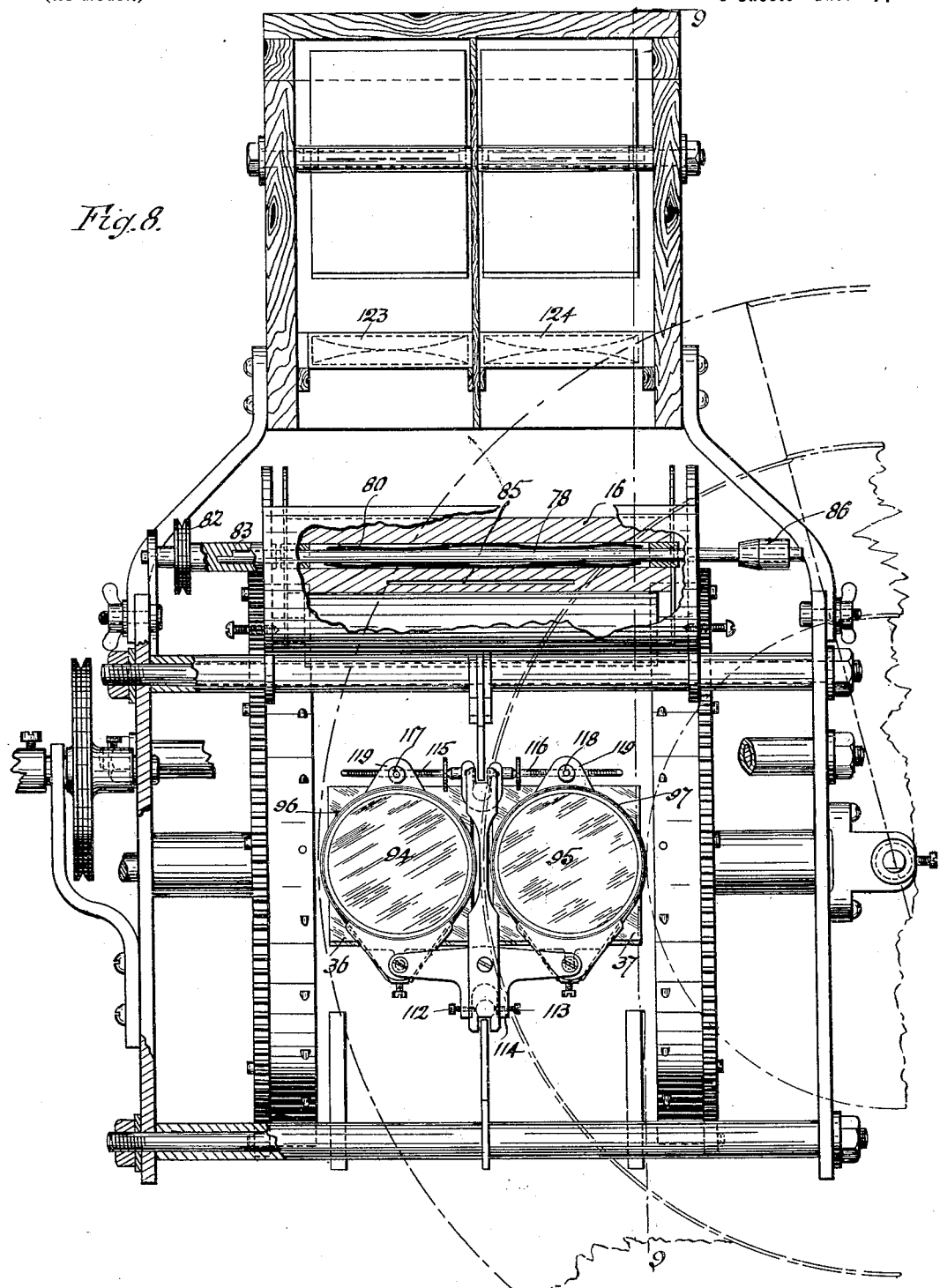

Figure 1 is a plan view of the apparatus arranged for the taking of the photographs. Fig. 2 is a plan view thereof, the case, the film, its carrying-rollers, and the screens below them being removed to show the interior mechanism of the apparatus. Fig. 3 is a side elevation, case being removed. Fig. 4 is a longitudinal vertical section on line 4 4 of Fig. 2 as seen in the direction of the arrow $a^2$. Fig. 5 is an end view of part of Fig. 2. Fig. 6 is a longitudinal vertical section on line 6 6 of Fig. 2 as seen in the direction of the arrow $a^6$. Fig. 7 is a view on a larger scale showing in detail the mirror movement. Fig. 8 is a front elevation, partly in section, of the apparatus when arranged for projection. Fig. 9 is a section on line 9 9 of Fig. 8, the film-holding devices being removed; and Fig. $9^a$ is a perspective view of part of Fig. 9. Fig. 10 is a front elevation showing on a smaller scale the shutter used for projection and indicated in dotted lines only in Fig. 8. Fig. 11 is a section on line 11 11 of Fig. 10.

My invention is based upon principles of the following nature: A mirror is so combined with a drum or its equivalent and a lens or suitable combination of lenses that the axis of rotation of the drum lies in the reflecting-surface of the mirror and the mirror moves upon said axis at half the rotary speed of the drum. By a "drum" is here understood any device which will carry part of a movable film and cause the same to follow a path which contains an arc of a circle having its center in the fixed axis of the moving mirror.

1 and 2 are two side frames united by bolts and nuts.

5 is a plate parallel to and midway between the frames 1 2, from which it is spaced by lengths of tube 6, surrounding the bolts 3.

Part of the plate 5 is cut away at 7 so as to form a slide-bed 8, in which either the shutter and lens attachment for taking the pictures or the projecting lenses for projecting them may be slid and attached, as hereinafter described. To the upper part of plate 5 is attached a bar 9, parallel to the bed 8, for assistance in guiding the aforesaid attachments. To the plate 5 are attached, for example, by lugs 10 and screws 11, screens 12 13, the side walls 14 14 15 15 of which carry the shafts of rollers 16 17 18 19.

20 is a shaft journaled in the end frames 1 2, carrying the pinions 21 22, gearing, respectively, with the toothed peripheries 23 24 of the wheels 25 26. These wheels are parallel to and equal to one another, and on their flanges 27 28 are pins 29, which engage the perforations 30 near the edges of the film 50 for the purpose of moving the film across the space between the wheels 25 26. The wheels 25 26 are journaled on the hollow shafts 32, carried, respectively, by the side frames 1 2 and by the standards 31, Fig. 6. The wheels 25 26 have naves 33 of suitable length to have bearing along the shafts 32, respectively.

Within each shaft 32 is a rod 34, movable longitudinally and adapted to be fixed by a set-screw 35, the inner end of the rod serving as a pivot-bearing for the axle of the mirror. There are two such mirrors 36 37, on opposite sides of which are the pivots 38 39, having bearing, respectively, in the ends of the rods 34 aforesaid and in a boss 40 on the middle plate 5.

Mechanism is provided to move the mirrors 36 37 in a rotary manner on their axes with an angular speed equal to half the angular speed of rotary movement of the wheels 25 26. A convenient mechanism by which the mirrors are positively moved by the motion of the wheels 25 26 is as follows: On the inner faces of the flanges 27 28 of the wheels 25 26 are projections, preferably made by extending the alternate pins 29 of each flange so that they project inward beyond the face of the flange, as at 47, Figs. 6 and 7. Concentrically with the wheels 25 26 there are pivoted levers 41 41, respectively connected by rods 42 42 to levers 43 43, rocking on arms 44 44, rigidly connected to the mirrors. The levers 43 43 have each two arms of equal length, and they are connected by rods 45 45 to stationary arms or means of attachment 46 46. The rods 45 are equal in length to the rods 42, and the pivotal points of rods 42 on levers 41 are at the same distance from the axis of the mirrors as the pivotal points of rods 45 on the arms 46. The angular movement of the levers 41 is thus transferred at exactly half speed to the mirrors, respectively. At the end of each lever 41 is a spring-controlled hook 48, adapted to be engaged by the pins 47 as they pass over it and be thus carried along with each pin in turn, thus causing the lever 41 to be carried along with the wheel 25 or 26 until the hook is tripped, for example, by the cord 480, the end of which is attached to the tail of the hook and the other end to some stationary part of the machine. When the lever 41, with the hook 48, has moved as far as the length of free cord 480 allows, the cord becomes taut and exercises tension on the tail of the hook 48, which draws the hook out of engagement with the pin 47, whereupon a spring, such as 49, returns the lever 41, and with it the mirror, quickly to its initial position. As the pins 47 are not alined on both wheels 25 26, but are alternated, the phases of the one mirror will also alternate with the phases of the other. It will be understood, therefore, that if a beam of light is projected, for example, from the lens upon one of the mirrors the latter will reflect it to the film, and during the movement of the film and mirror (the latter moving at only half the speed of the film) the same part of the film will continue to receive the same ray without any lengthening or shortening of the path of that ray from the lens to the film, so that a certain view can be photographed onto a moving film during a certain duration of its movement, or from a moving film a stationary image stationary in all its parts can be projected. It is obvious that after such projection onto or from a moving film during the passage of the particular part thereof which receives or gives the image through the before-mentioned are, it is necessary to discontinue the projection and to recommence the same onto or from the next following portion of the same film. In order to create or reproduce the succeeding image or picture, there will be an interval of darkness or non-reproduction during the time taken by the mirror to revert to its first position. To avoid the appearance of this interval, I have preferred to duplicate the apparatus, as I have assumed to be the case in the foregoing description, having thus two mirrors working alternately, two lenses or combinations for photographic or projection purposes, and a suitable source of light, if for projection, also preferably in duplicate. The film-band is then provided with two series of photographs, or, in other words, with one series arranged alternately in two lines and alternating one with the other.

As it is desirable to take each photograph of a series from exactly the same standpoint— that is to say, through one lens only and not alternately through two lenses—and as it is required, as aforesaid, to project the images alternately into two lines on the film, I employ a suitable arrangement of mirrors and shutters or of movable reflecting-shutters acting also as mirrors and other stationary mirrors for reflecting images alternately, as before mentioned, care being taken that the length of passage of equivalent rays to the places where the images are to be thrown on the film shall always be equal in order to strictly preserve the same scale of representation.

The photographic lens and shutter attachment (best seen in position in Figs. 2 and 4) comprises a base-plate 51, supported on two forked legs 52 52, the forked ends of which straddle the part 8 of the plate 5 and are fixable in lateral adjustment by abutment set-screws 53 on one side and clamping-screws 54 on the other side. An upwardly-directed forked arm 55 is similarly fixable on the bar 9. On the base-plate 51 is the mount of the photographic objective 56, the field of which is cut by the rotary shutter 57. Behind the objective and in a plane to which the axis of the objective is inclined at an angle of forty-five degrees is a rotary mirror 58, partly cut away and forming also a shutter. Parallel to mirror 58 is the stationary mirror 59 and at right angles thereto the mirrors 60 and 61, parallel to each other.

The shaft 20 drives the shaft 62 through beveled gear 63 64 and the latter drives the shaft 65 through beveled gear 66 67. The shaft 65 drives the shaft 68 through beveled gear 69 70. The shaft 68 carries the shutter 57 and also drives the shaft 71 of the mirror 58 through the beveled gear 72 73, so that the mirror 58 revolves at half the speed of the shutter 57. The beveled wheels 63 64 66 67 69 70 are so proportioned that the shutter 57 makes one revolution during a part revolution of wheels 25 26 equivalent to the length of film equal to half of one picture. The shutter 57 and the mirror 58 are semicircles, and at each revolution of the shutter 57 the mirror will be alternately in such position as either to reflect the rays to mirror 59, and thus to mirror 36, or to allow the rays to freely pass to mirror 60, whence they are reflected to mirror 61 and thence to mirror 37.

The outer end of the shaft 65 is supported in a bearing in the side of a collar 74, which is formed at the end of the bracket 75. The hub 76 of the beveled wheel 66 is grooved to revolve in said collar 74 without endwise motion therein. The beveled wheel 66 can slide loosely longitudinally of the shaft 62, but is attachable thereto by the set-screw 76ª, which may be screwed up to engage the flat part 77 of shaft 62. This arrangement permits of the beveled gearing 66 67 being removed and replaced when the whole photographic lens and mirror fitting is removed or replaced.

To carry the film, I may use two rollers 19 16, loosely mounted on their shafts 78 79, but having frictional engagement therewith by springs 80, Fig. 8, to compensate for difference in diameter at different stages of winding. The film from roller 19 may be led under suitable rollers 18 17 and over part of wheels 25 26, so as to remain in contact with the wheels 25 26 over about one-sixth of their circumference. The film is then wound on roller 16. To the latter motion may be given by means of belt 81, passing around pulley 82 on the part 83 of the shaft 78 and around pulley 84 on shaft 20, Fig. 1. The rollers 16 19 have slots 85, Fig. 8, for engagement of the ends of the films, and to enable the rollers 16 19 to be easily inserted and removed the shafts 78 79 may be made as illustrated for shaft 78 in Fig. 8—namely, so as to be capable of being drawn out by knob or the like 86, so as to leave the roller free to be taken from the shield 14 or 15. The end of shaft 78 engages in a recess in shaft 83 in such a way as to be positively turned with said shaft 83.

When the above-described apparatus is used for the taking of a series of photographs, it is inclosed in a suitable light-tight case 84, Fig. 4, the lens-mount flange 85ª engaging the end of a bellows extension 86, so that light may not enter the case from the orifice 87 therein except through the lens. The apparatus is operated by crank-handle 88, the shaft 89 of which in this instance is passed from outside through an orifice in the side of the case to engage the end of shaft 90, whence pulley 91 and crossed belt 92 convey motion to pulley 93 on a shaft 20.

Figs. 8 to 11 illustrate the attachments for use in projecting with this invention. In place of the photographic lens and mirror attachment, which are removed, the projecting attachment, comprising the two objectives 94 95, is inserted in a similar manner. The mounts 96 97 of the objectives 94 95 rest on curved seats 98, carried by a shaft 99, supported in pivotal bearings 100 101 in arms 102 103, radiating from a central shaft 104, supported in pivotal bearings 105 106 in the end frames 107 108, attached to each other by bars 109 110 and forked to engage the parts 8 and 111 of the plate 5 in somewhat the same manner as the former attachment. Rocking adjustment can be given to the pair of objectives by the screws 112 113 in the arm 114, forming part with shaft 104. Rocking adjustment can be given to each objective separately by screws 115 116 engaging nuts 117 118 in lugs 119 at the top of the strap 150, which secures each mount 96 97 on its seats 98, the said strap 150 surrounding the mount and passing under a saddle 151 under the shaft 99 and tightened by a set-screw 152. On the shaft 62 is now fixed the shutter 120, Figs. 9, 10, 11. (Shown in dotted lines in Fig. 8.) It has the two open spaces 121 122, each covering an arc of one hundred and eighty degrees and corresponding to the position of the respective objectives 94 95, as shown in Fig. 8. From any suitable source light is projected through condensers 123 124 through the film 50 to the mirrors 36 37 and thence to objectives 94 95.

It being of importance to have the mirrors 36 37 to work exactly, I prefer to make the rods 42 45 work upon pivots similar to knife-edges, and, furthermore, to make at least one of the lever-arms of lever 43 adjustable by making the forked knife-edge pivot 125, against which one of the rods 42 45 engages, so that it may be adjusted more or less from the fulcrum of the lever 43, for example, by making this pivot 125 on a sliding bar 126, guided in the lever 43 and having a lug 130, riding on a screw-threaded pin 127, fixed to the lever on which its position is adjusted by two nuts 128 129. Springs 131 132 133 134 hold the rods 42 45 seated in the knife-edges 125 135 136 137. It will be understood, however, that other constructions may be readily used for insuring accuracy of working of the mirrors and that my invention is not confined to the use of the means herein described.

I declare that what I claim is—

1. The combination of a drum having means for engagement of a photographic film, means for continuously revolving said drum, a plane mirror having the axis of said cylinder in its reflecting-plane and means for giving vibratory movement to said mirror about said axis the velocity of said vibratory movement in one direction being equal to half the angular velocity of the movement of the drum.

2. The combination of a drum having means for engagement of a photographic film, means for continuously revolving said drum, a plane mirror having the axis of said drum in its reflecting-surface, means for giving a rotary movement to said mirror in one direction about said axis, the velocity of said rotary movement being equal to half the angular velocity of the movement of the drum and means for giving a practically-instantaneous return movement to said mirror to bring it to its initial position.

3. The combination of two parallel wheels 25, 26 having means for engagement of a photographic film, means for continuously revolving the said wheels, a plane mirror having the axes of said wheels in its reflecting-plane, and means for giving vibratory movement to said mirror about said axis, the velocity of said vibratory movement in one direction being equal to half the angular velocity of the movement of the wheels.

4. The combination of means for moving a photographic film through a segment of a cylinder, a pair of plane mirrors having the axis of said cylinder in their reflecting-plane and means for alternately giving vibratory movement to each of said mirrors about said axis; the velocity of said vibratory movement in one direction being equal to half the angular velocity of the movement of the film.

5. The combination of means for moving a photographic film through a segment of a cylinder, a pair of plane mirrors having the axis of said cylinder in their reflecting-surfaces, means for alternately giving a rotary movement to each of said mirrors in one direction about said axis the velocity of said rotary movement being equal to half the angular velocity of the movement of the film and means for giving a practically-instantaneous return movement to each of said mirrors to bring them alternately to their initial position.

6. The combination with a drum, means for revolving the same, a series of projections 47 therein; a pivoted arm 41 a trip-hook 48 on said arm adapted to engage the projections 47, means for tripping said hook after it has passed through a predetermined distance; an oscillatory mirror, an arm 44 integral with said mirror, two-armed levers 43 fulcrumed on arm 44, a stationary attachment, and connectors 42 45 connecting the lever 43 to arm 41 and to the stationary attachment respectively whereby angular movement is given to the mirror with a velocity equal to half that of the drum upon engagement of hook 48 with one of the projections 47, and means for returning the mirror and its attached parts to their initial position on the tripping of hook 48.

7. The combination with means for moving a kinematograph-film of a mirror mounted to oscillate upon an axis lying in its reflecting-surface, an arm integral with said mirror, a two-armed lever 43 fulcrumed on said arm, a lever 41 having its pivotal axis in the axis of said mirror, a connector for connecting the lever 41 to one arm of the lever 43, a stationary attachment and a connector for connecting the said attachment to the other arm of the lever 43 means for engaging and positively moving the lever 41 in accordance with the movement of the film, means for tripping said lever 41 and means for returning the latter to its normal position.

8. The combination with means for moving a kinematograph-film of a mirror mounted to oscillate upon an axis lying in its reflecting-surface, an arm integral with said mirror, a two-armed lever 43 fulcrumed on said arm, a lever 41 having its pivotal axis in the axis of said mirror, a connector for connecting the lever 41 to one arm of the lever 43, a stationary attachment and a connector for connecting the said attachment to the other arm of the lever 43, means for engaging and positively moving the lever 41 in accordance with the movement of the film means for tripping said lever 41 and a spring for returning the lever 41 and parts connected therewith substantially instantaneously to their normal position.

9. The combination of two parallel wheels 25 26 adapted to carry a photographic film, means for rotating said wheels, two mirrors mounted side by side between said wheels a lens, a rotary part-shutter at an angle of forty-five degrees to the axis of the lens and having a reflecting-surface, means for driving said shutter, a mirror parallel thereto, a mirror at right angles to said shutter and a mirror parallel to the last-named mirror, whereby the image from said lens is alternately reflected to the right and the left hand portions of the film.

In witness whereof I have signed this specification in the presence of two witnesses.

W. BRITAIN, Jr.

Witnesses:
 A. J. HADDAN,
 C. ROCHE.